US009475650B2

(12) United States Patent
Ota et al.

(10) Patent No.: US 9,475,650 B2
(45) Date of Patent: Oct. 25, 2016

(54) SCREW SUPPLY APPARATUS

(71) Applicant: OHTAKE ROOT KOGYO CO., LTD., Iwate (JP)

(72) Inventors: Yoshitake Ota, Iwate (JP); Hiroshi Takahashi, Iwate (JP)

(73) Assignee: OHTAKE ROOT KOGYO CO., LTD., Iwate (JP)

( * ) Notice: Subject to any disclaimer, the term of this patent is extended or adjusted under 35 U.S.C. 154(b) by 107 days.

(21) Appl. No.: 14/592,159

(22) Filed: Jan. 8, 2015

(65) Prior Publication Data

US 2015/0239676 A1     Aug. 27, 2015

(30) Foreign Application Priority Data

Feb. 22, 2014   (JP) ................................ 2014-032376

(51) Int. Cl.
  *B65G 27/02*   (2006.01)
  *B65G 47/14*   (2006.01)
  *B23P 19/00*   (2006.01)

(52) U.S. Cl.
  CPC ......... *B65G 47/1428* (2013.01); *B23P 19/003* (2013.01); *B23P 19/004* (2013.01); *B65G 27/02* (2013.01)

(58) Field of Classification Search
  CPC ...................................................... B67B 3/00
  See application file for complete search history.

(56) References Cited

U.S. PATENT DOCUMENTS 3,779,422 A * 12/1973 Mori .................. B65G 47/1478
  198/398
5,702,028 A * 12/1997 Shirodera .............. A44B 19/42
  209/615

FOREIGN PATENT DOCUMENTS

| JP | 09-058847 | 3/1997 |
| JP | 2001-287827 | 10/2001 |
| JP | 2008-094522 | 4/2008 |

* cited by examiner

*Primary Examiner* — Gene Crawford
*Assistant Examiner* — Ayodeji Ojofeitimi
(74) *Attorney, Agent, or Firm* — Lex IP Meister, PLLC

(57) ABSTRACT

A screw supply apparatus includes a screw feeding unit, a screw transfer unit, and an escape unit. In the screw supply apparatus, the screw feeding unit includes a rotating drum having a horizontal rotating shaft. At a rear surface fixation bearing portion positioned on the rear surface side of the rotating drum, a screw input portion is provided for introducing screws into the rotating drum. Also, at a front surface fixation bearing portion positioned on the front surface side of the rotating drum, an opening is formed. The screw transfer unit includes a pair of transfer rails, which has a central groove and is inserted from the opening of the front surface fixation bearing portion into the rotating drum. In the vicinity of the outer circumference of the rotating drum, a drive cam is provided.

10 Claims, 16 Drawing Sheets

FIG. 12]
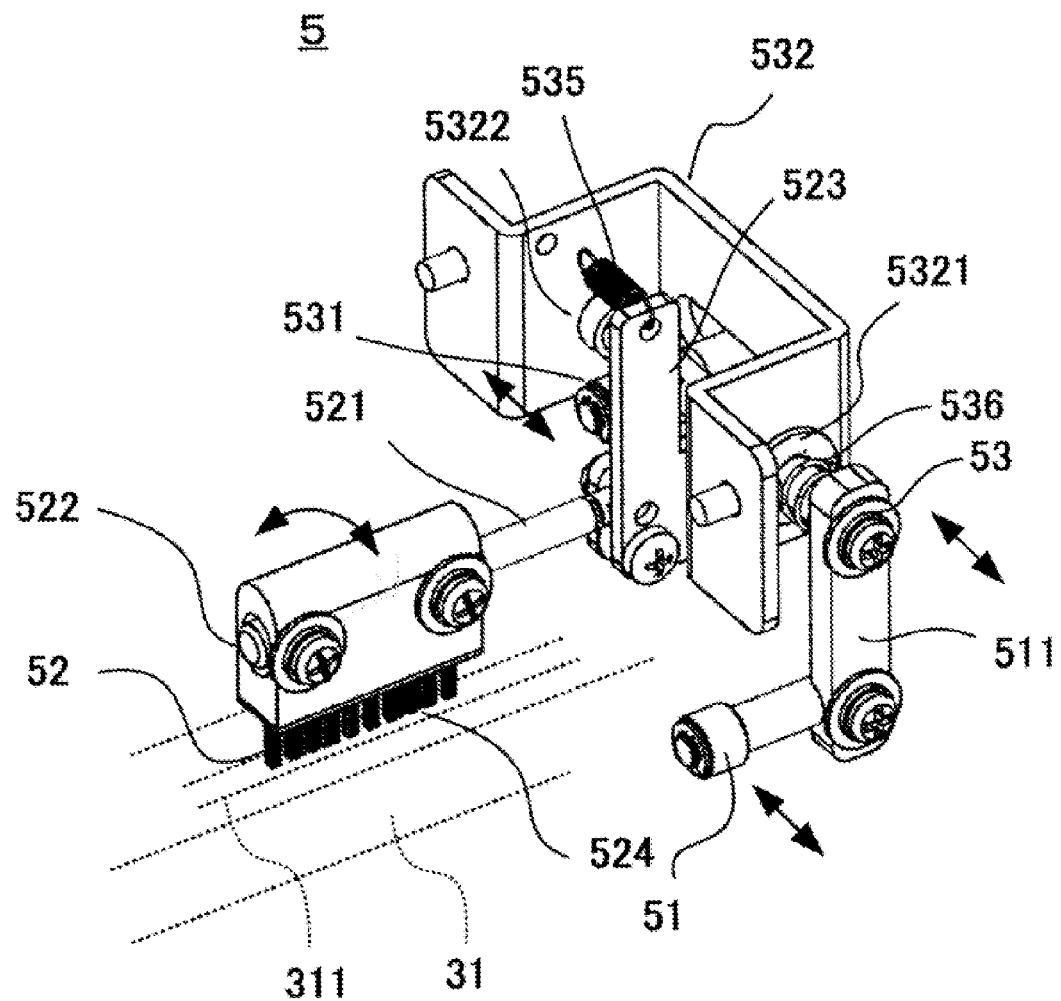

CROSS SECTION ALONG LINE E-E

SCREW SUPPLY APPARATUS

CROSS-REFERENCES TO RELATED APPLICATION

This application claims priority to Japanese Patent Application No. 2014-032376 filed on Feb. 22, 2014, the contents of which are incorporated herein by reference.

BACKGROUND OF THE INVENTION

1. Field of the Invention

The present invention relates to a screw supply apparatus which accommodates a number of screws each of which has a head part and a rod-like screw part, or a number of other products such as rivets or tacks similar to screws, separates and aligns them, and discharges them one by one so as to supply them, and particularly, to a screw supply apparatus which supplies micro screws having comparatively small sizes.

2. Description of the Related Art

This kind of a screw supply apparatus has been disclosed in Japanese Patent Application Laid-Open No. 2008-94522. The screw supply apparatus is a component supply apparatus which aligns components such as headed components or flanged components, and puts the components into a specific posture such that a fastening device such as a screw fastening device can easily take the components out, and supplies the components. The component supply apparatus has a carrier rail, which has a guide groove which extends in a straight line direction and from which screws S are suspended. The carrier rail has a straightly advancing vibration part which holds the carrier rail so as to incline the guide groove by a predetermined angle, and an escape unit which erects each screw S if the corresponding screw S reaches the leading end of the carrier rail.

In the component supply apparatus of the related art disclosed in Japanese Patent Application Laid-Open No. 2008-94522, the carrier rail should be curved upright from the predetermined inclination angle, and thus may not smoothly carry some components such as screws. Also, if the whole groove of the carrier rail is upright, comparatively small-sized components such as micro screws S may overlap each other on the carrier rail, and may not be completely aligned.

Also, since a scoop blade of the inside of a screw feeding drum is provided over the full length of the drum, some screws S may not fall to a receiving plate, and screws often fall to positions deviated from the receiving plate.

SUMMARY OF THE INVENTION

The present invention was made in view of those problems, and an object of the present invention is to propose a screw supply apparatus which has a screw discharging unit positioned at the leading end of a transport rail, and aligns components such as screws, particularly, comparatively small-sized micro screws, and efficiently transfers the aligned components to the screw discharging unit, and makes each component stand by in a screw outlet.

In order to achieve the above described object, a screw supply apparatus includes a screw feeding unit, a screw transfer unit, and a screw discharging unit. In the screw supply apparatus, the screw feeding unit includes a rotating drum having a horizontal rotating shaft. At a rear surface fixation bearing portion positioned on the rear surface side of the rotating drum, a screw input portion is provided for introducing screws into the rotating drum. Also, at a front surface fixation bearing portion positioned on the front surface side of the rotating drum, an opening is formed. The screw transfer unit includes a pair of transfer rails, which has a central groove and is inserted from the opening of the front surface fixation bearing portion into the rotating drum. In the vicinity of the outer circumference of the rotating drum, a drive cam is provided. Further, a cam roller is provided so as to come into contact with the drive cam according to rotation of the rotating drum. If a screw is mounted on the transfer rails so as to be on top of any other screw, the cam roller is operated, whereby a screw dropping mechanism is operated so as to drop the unaligned screw into the rotating drum.

According to the invention, the rotating drum accommodates blade units which have screw sliding surfaces extending obliquely along the inner circumference over the full length of the inner wall of the rotating drum, and the oblique extension direction of each blade unit is set such that as the rotating drum rotates, screws fall onto a screw receiving part of a start end portion of the transfer rails.

According to the invention, the screw receiving part extends to the vicinity of the screw input portion of the rotating drum.

According to the invention, a full-state detecting unit is provided so as to detect whether there is any screw on the transfer rails in the vicinity of the opening. If the full-state detecting unit detects that there is a screw, rotation of the rotating drum is stopped, and if the full-state detecting unit detects that there is no screw, the rotating drum is rotated. Also, the full-state detecting unit includes a light emitting unit and a light receiving unit, which use the tips of optical fibers.

According to the invention, the screw discharging unit has a screw outlet for taking out screws and a leading-end screw detecting unit for detecting whether any screw necessary to be discharged exists in the vicinity of the screw outlet. In a case where the leading-end screw detecting unit detects that there is a screw, a screw extracting mechanism of the screw discharging unit is operated so as to extract the corresponding screw from the final end portion of the transfer rails and arrange the corresponding screw in the screw outlet. The leading-end screw detecting unit includes a light emitting unit and a light receiving unit, which use the tips of optical fibers.

According to the invention, the screw dropping mechanism includes a pivot shaft which is swung to the left and right by the cam roller, a brush shaft which is connected to the pivot shaft and is rotated by an operation of the pivot shaft, and a brush which is provided at the leading end portion of the brush shaft extending in the rotating drum. If a screw is mounted on the transfer rails so as to be on top of any other screw, the tips of the brush swing, thereby shaking off the unaligned screw such that the corresponding screw falls and is aligned.

According to the invention, the screw dropping mechanism includes a cylinder portion which is operated by movement of the cam roller to the left and right. If a screw is mounted on the transfer rails so as to be on top of any other screw, the screw dropping mechanism blows the unaligned screw off with air of the cylinder portion such that the corresponding screw falls and is aligned.

According to the invention, the screws are micro screws.

According to the invention, it is possible to efficiently align screws S, particularly, comparatively small-sized micro screws. Also, according to rotation of the rotating drum, the drive cam provided in the vicinity of the outer circumference of the rotating drum rotates, whereby the cam roller being in contact with the drive cam operates, thereby driving the screw dropping mechanism. Therefore, it is unnecessary to separately provide a driving source for the screw dropping mechanism. Further, since the pair of transfer rails of the screw transfer unit is linear, screws smoothly move, and the apparatuses are simply configured, and are stable, and can be easily maintained.

According to the invention of the screw supply apparatus, the rotating drum accommodates the blade units which have the screw sliding surfaces extending obliquely along the inner circumference over the full length of the inner wall of the rotating drum. Therefore, it is possible to surely scoop up screws S and drop screws onto the screw receiving unit of the start end portion of the transfer rails.

According to the invention of the screw supply apparatus, the screw receiving unit extends to the vicinity of the screw input portion of the rotating drum. Therefore, it is possible to lengthen the transfer rails, and to dispose the screw dropping mechanism or the like on the transfer rails between the screw input portion and the front surface fixation bearing portion of the discharge side.

According to the invention of the screw supply apparatus, it is provided the full-state detecting unit for detecting whether there is any screw S on the transfer rails in the vicinity of the opening. If the full-state detecting unit detects that there is any screw S, rotation of the rotating drum is stopped. Meanwhile, if the full-state detecting unit detects that there is no screw, the rotating drum is rotated. Therefore, it is possible to efficiently drive the rotating drum. Also, the light emitting unit and the light receiving unit use the tips of optical fibers, and thus can surely act even on small-sized screws S.

According to the invention of the screw supply apparatus, it is provided the screw outlet for taking out screws, and, it is provided leading-end screw detecting unit for detecting whether there is any screw necessary to be taken out in the vicinity of the screw outlet, and the screw extracting mechanism of the screw discharging unit is operated by the leading-end screw detecting unit. Therefore, it is possible to surely prepare a screw in the screw outlet. Also, the light emitting unit and the light receiving unit use the tips of optical fibers, and thus can surely act even on small-sized screws S.

According to the invention of the screw supply apparatus, on the transfer rails, the brush of the screw dropping mechanism is provided so as to swing, and shakes unaligned screws S off from the transfer rails to the inner bottom of the rotating drum. Therefore, it is possible to surely align screws. Especially, small-sized micro screws may be transferred even if they overlap each other. However, according to this invention, it is possible to surely align micro screws by rotation of the brush.

According to the invention of the screw supply apparatus, flow of air coming in and out of the screw dropping mechanism is used. Therefore, it is possible to surely align components such as screws without damaging them. Especially, small-sized micro screws may be transferred even if they overlap each other. However, according to this invention, it is possible to surely align micro screws by flow of air.

The invention of the screw supply apparatus of claim 8 can act more appropriately on micro screws.

BRIEF DESCRIPTION OF THE DRAWINGS

FIG. 12 is a perspective view illustrating a drive part of the screw dropping mechanism of the first embodiment.

FIG. 13A is a plan view illustrating a state where a screw has been discharged into a screw outlet, and FIG. 14B is a plan view illustrating a state where a screw extracting mechanism has returned to the transfer rails and has extracted a screw S, and FIG. 14C is a plan view illustrating a state where a screw stands by in the screw outlet.

DESCRIPTION OF EXEMPLARY EMBODIMENT

[First Embodiment]

Hereinafter, a screw supply apparatus according to a first embodiment of the present invention will be described in detail with reference to the accompanying drawings.

Figure 1:
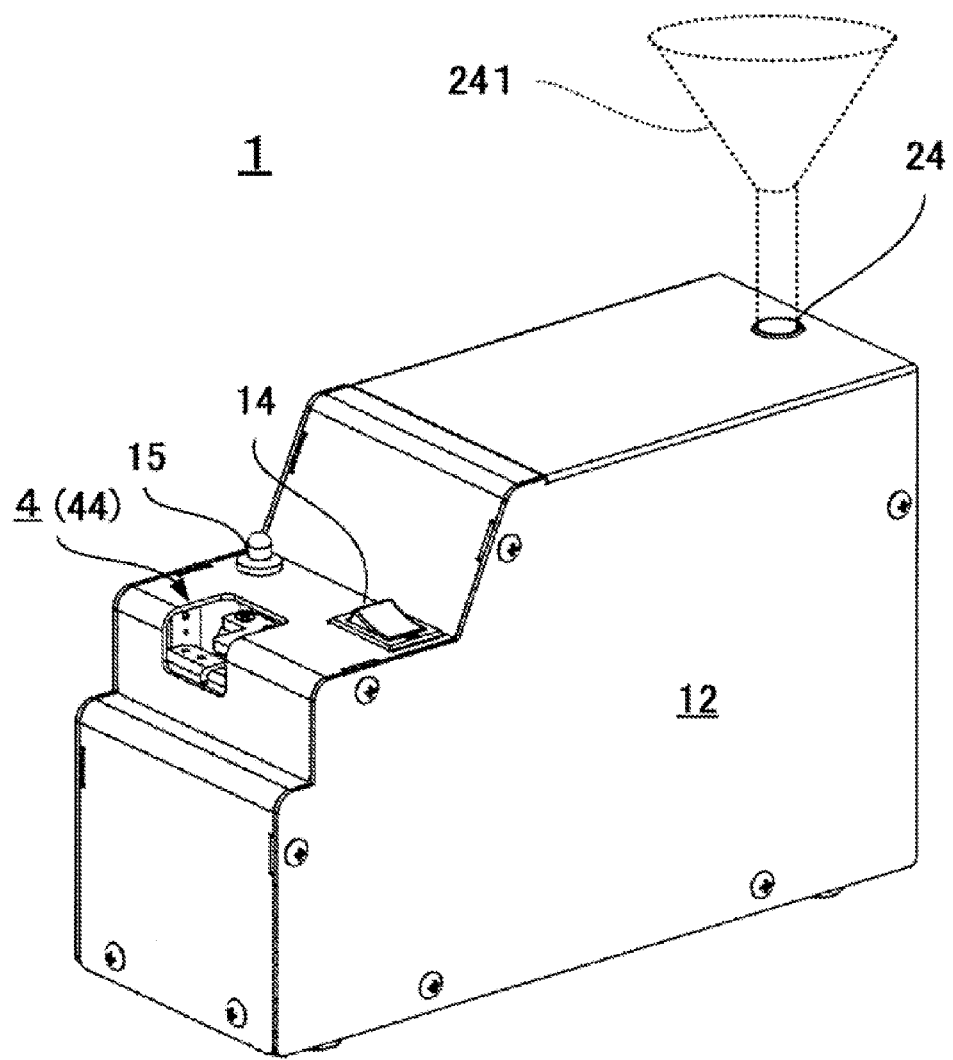
FIG. 1 is a perspective view illustrating the external appearance of a screw supply apparatus of a first embodiment of the present invention.
Figure 2:
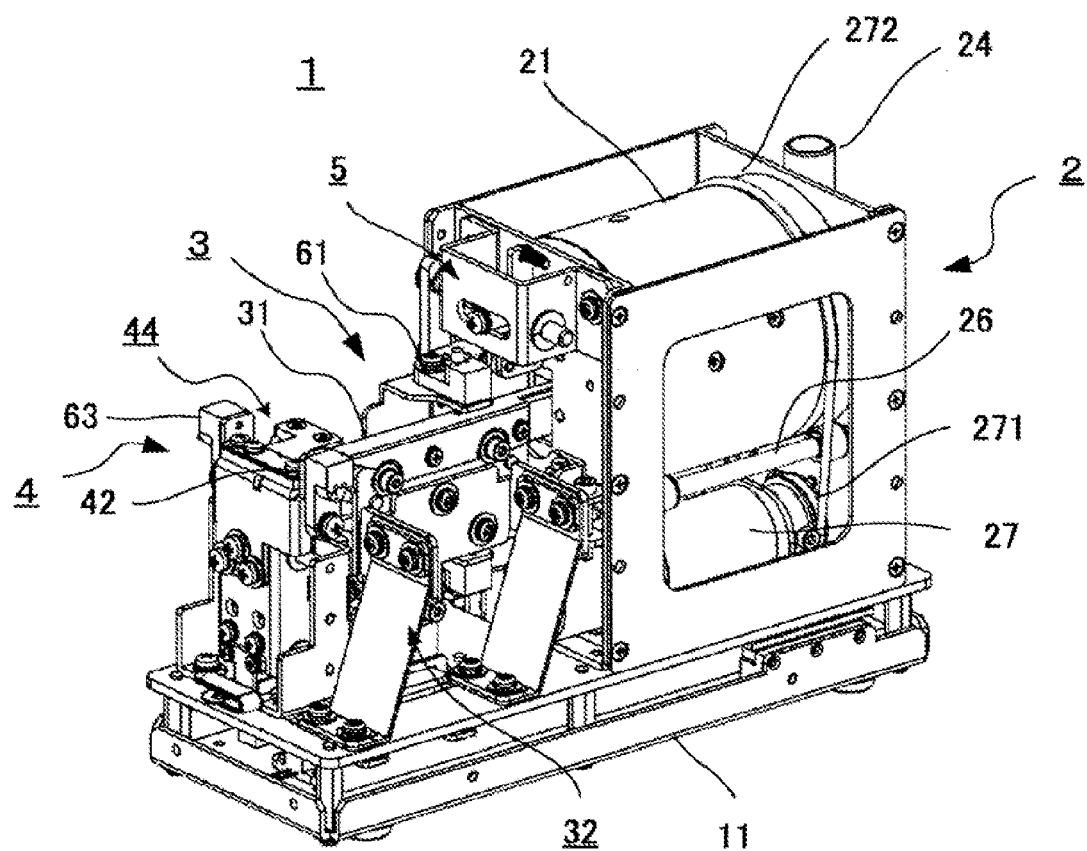
FIG. 2 is a perspective view illustrating the screw supply apparatus of FIG. 1 with a cover case removed as seen from the right side.
Figure 3:
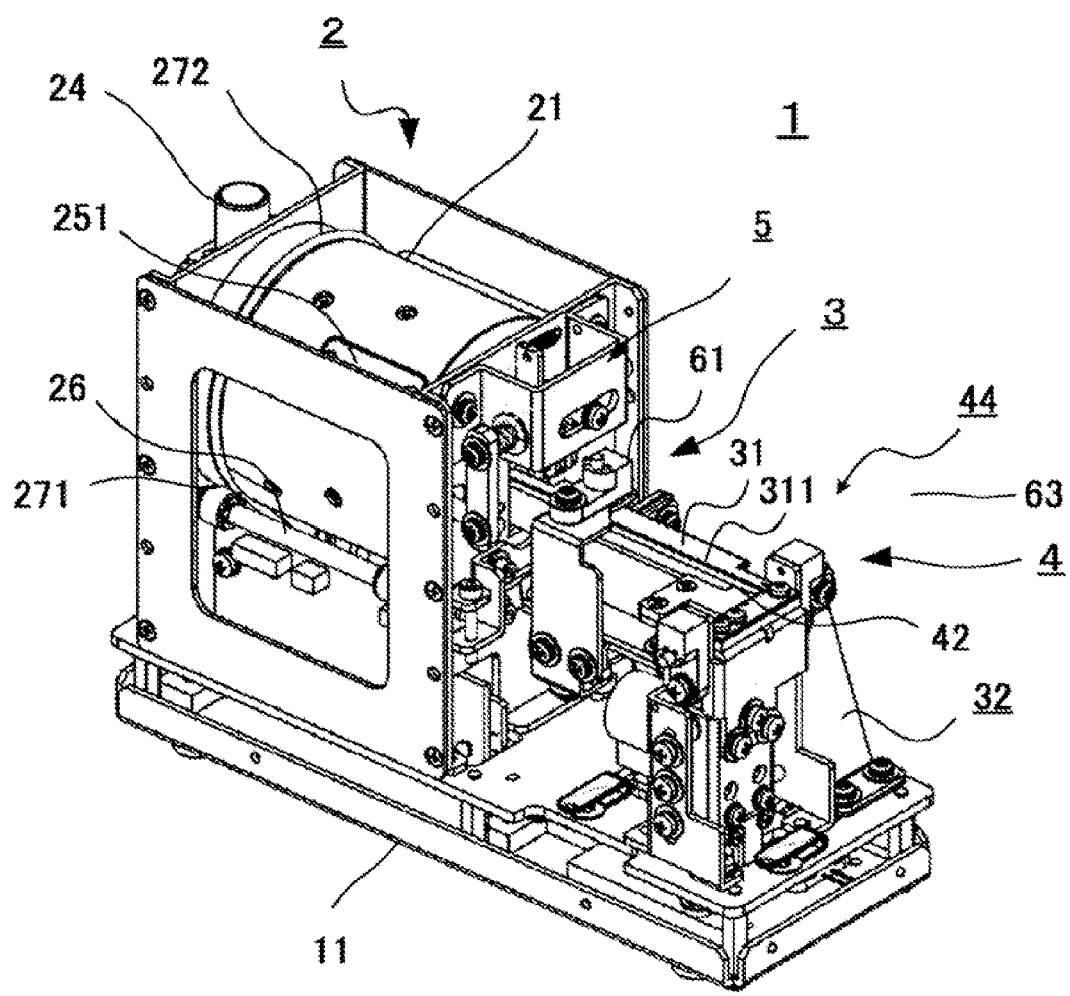
FIG. 3 is a perspective view illustrating the screw supply apparatus of FIG. 1 with the cover case removed as seen from the left side.

FIG. 1 is a perspective view illustrating the external appearance of the whole screw supply apparatus 1 of the first embodiment, and FIGS. 2 and 3 are perspective views illustrating the external appearance of the whole screw supply apparatus 1 with a cover case 12 removed. As shown in FIGS. 2 and 3, the screw supply apparatus 1 roughly includes a screw feeding unit 2, a screw transfer unit 3, and a screw discharging unit (an escaper unit) 4, which are disposed on a base frame 11. As shown in FIG. 1 where the cover case 12 has been mounted, a power switch 14 for starting or stopping an operation is disposed, and the screw supply apparatus 1 is connected to a power connector 17 (see FIG. 5). If the screw supply apparatus is ready to discharge screws, an LED 15 is turned on. On the rear end side of the top surface of the cover case 12, a screw input portion 24 is disposed, and on the front end side of the top surface of the cover case 12, a screw outlet 44 of the screw discharging unit (the escaper unit) 4 is disposed. If a screw S is sent to the screw outlet 44, the screw is taken out by hand or a robot.

Here, in general, screws S useable in the screw supply apparatus 1 of the present invention are comparatively small-sized screws called micro screws, and in the present invention, the diameters of screws are about from 0.5 mm to 5 mm, and screws can be made of any materials such as metals or plastic.

[Screw Feeding Unit 2]

Figure 4:
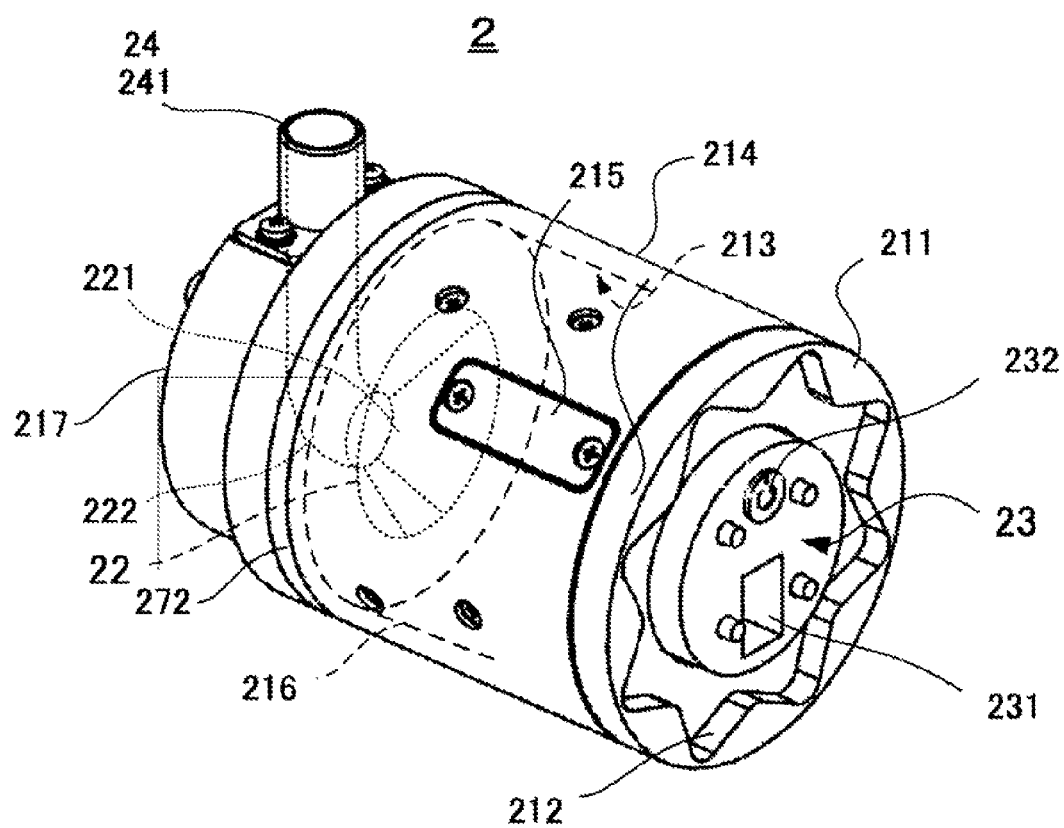
FIG. 4 is a perspective view illustrating a rotating drum of FIG. 1.

In FIGS. 2, 3 and 4, the screw feeding unit 2 of the screw supply apparatus 1 is composed of a rotating drum 21 having a horizontal rotating shaft, and at a rear surface fixation bearing portion 22 positioned on the rear surface side of the rotating drum 21, the screw input portion 24 is provided. Here, if necessary, screws S (micro screws) are introduced from an input member 241 having an inverted cone shape into the rotating drum 21.

In the structure as shown in FIGS. 4, and 6 to 9, screws S input to the screw input portion 24 are introduced into the internal opening 221 of the rear surface fixation bearing portion 22, and is input to the rotating drum 21 through a screw introduction path 222. In a front surface fixation bearing portion 23 positioned on the rear surface side of the rotating drum 21, an opening 231 is provided, and as shown in FIG. 5 in which some components such as the rotating drum 21 have been removed, as the screw transfer unit 3, a pair of linear transfer rails 31 having a central groove 311 is inserted from the opening 231 of the front surface fixation bearing portion 23 of FIG. 4 into the rotating drum 21, and in the vicinity 211 of the outer circumference of the rotating drum 21, a drive cam 212 is provided so as to drive a screw dropping mechanism 5 (to be described below)

Figure 5:
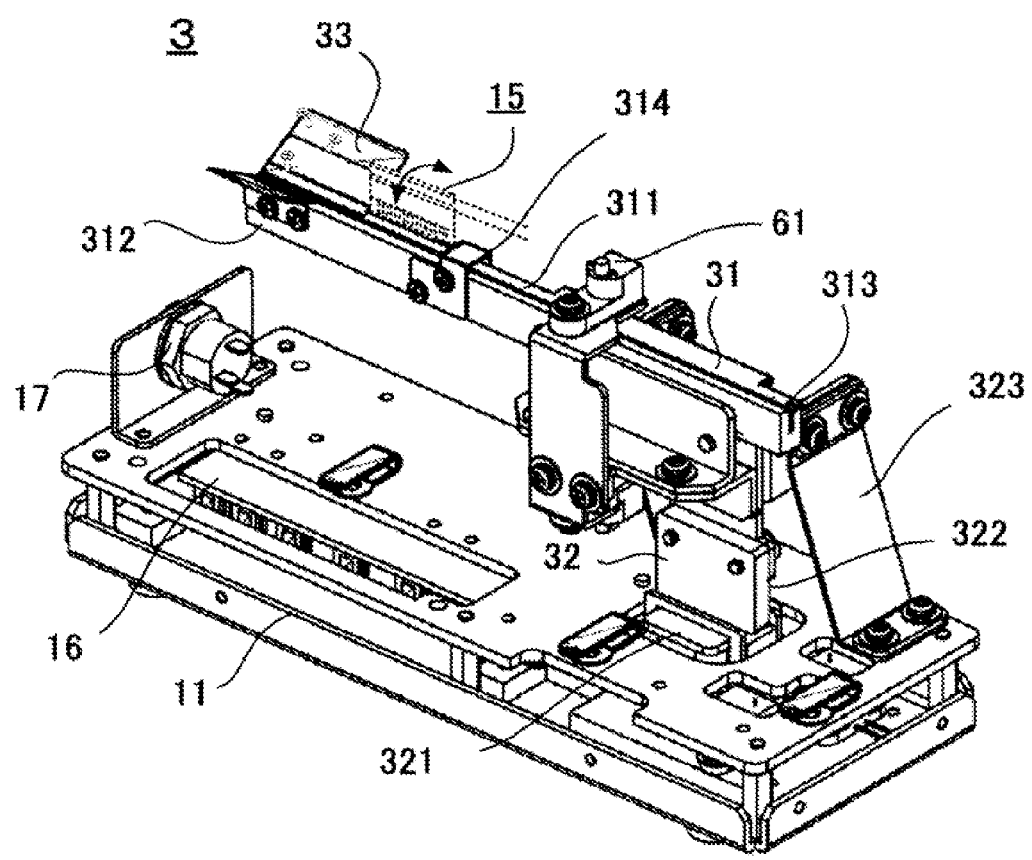
FIG. 5 is a perspective view illustrating a screw transfer unit of FIG. 1.

On the occasion of transferring screws S, the screw parts (rod-like part) of the screws S are fit into the central groove 311 of the transfer rails 31 of FIG. 5, and the head parts S2 of the screws are suspended from the two linear transfer rails 31 parallel to each other. Then, the transfer rails 31 moves the screws S forward by vibration of a vibrating device 32.

In this case, if a screw S is mounted on the transfer rails 31 so as to be on top of any other screw, the screw dropping mechanism 5 drops the unaligned screw S into the rotating drum 21.

Although the details of the screw dropping mechanism 5 will be described (see FIGS. 10 and 11), as the rotating drum 21 rotates, the drive cam 212 provided in the vicinity 211 of the outer circumference of the rotating drum 21 also rotates, whereby a cam roller 51 of the screw dropping mechanism 5 being in contact with the drive cam 212 operates, whereby the screw dropping mechanism 5 operates such that if a screw S is mounted on the transfer rails 31 so as to be on top of any other screw, the screw dropping mechanism 5 drops the unaligned screw S into the rotating drum 21.

[Structure of Rotating Drum 21]

Here, the structure of the rotating drum 21 will be described in detail with reference to FIGS. 6A, 6B, 7, and 8.

Figure 6A:
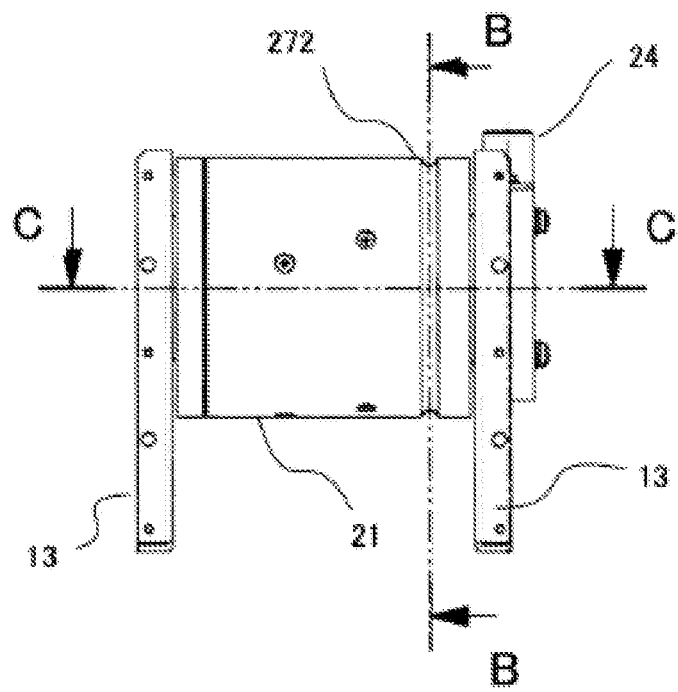
FIGS. 6A and 6B are a side view and a rear view illustrating a state where the rotating drum of FIG. 4 has been attached to a drum bearing fixation frame, respectively.
Figure 6B:
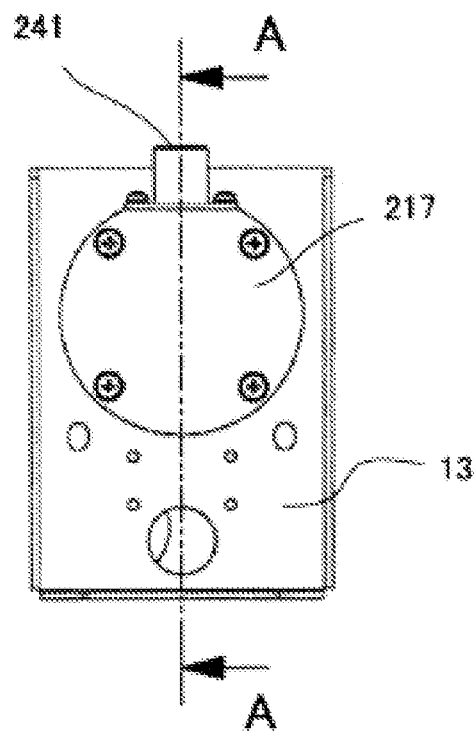
Figure 7:
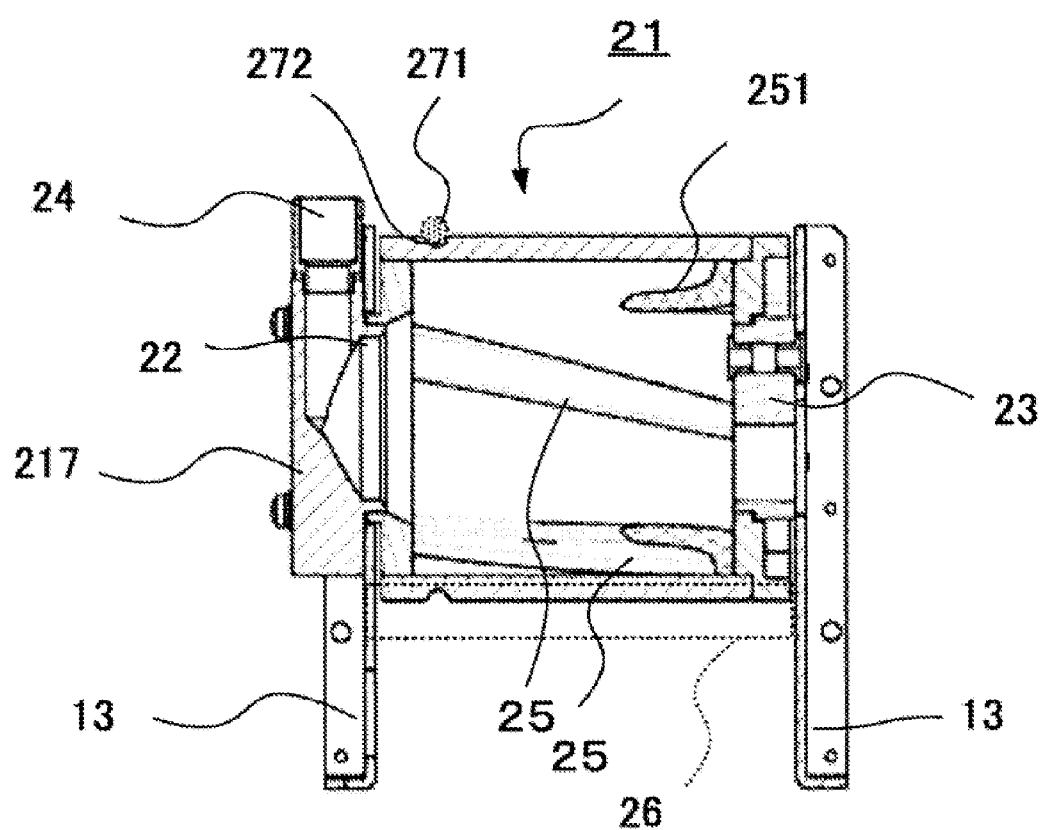
FIG. 7 is a cross-sectional view taken along a line A-A of FIG. 6B.
Figure 8:
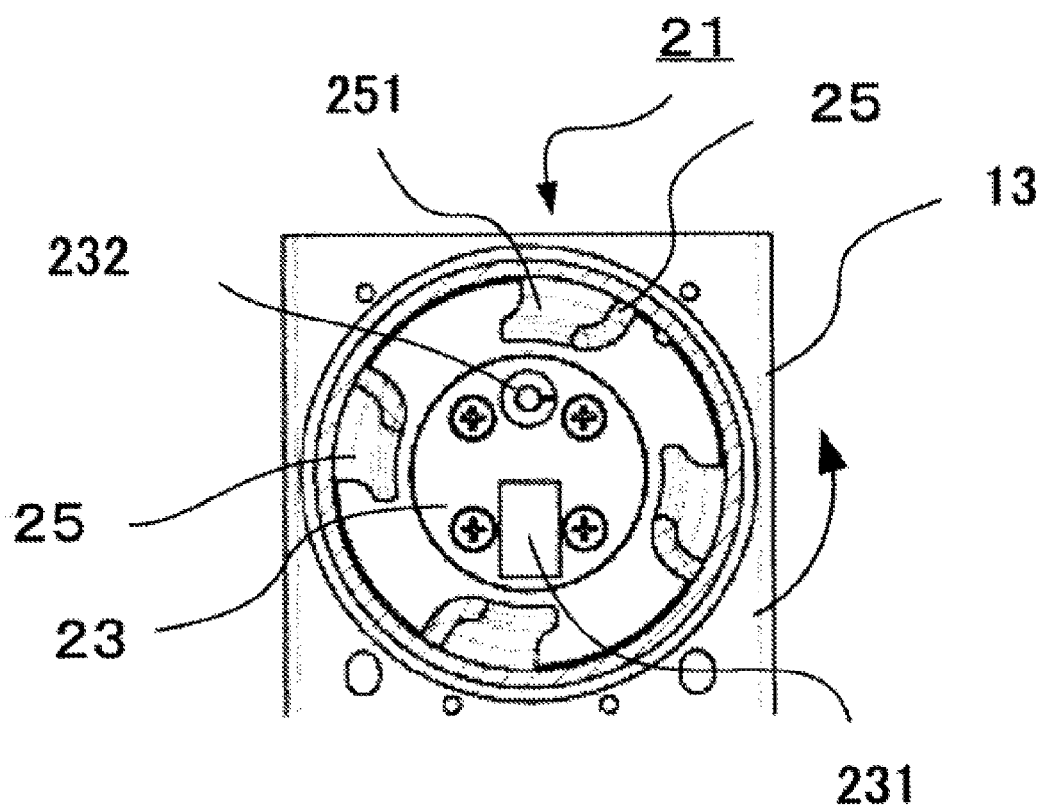
FIG. 8 is a cross-sectional view taken along a line B-B of FIG. 6A.

As shown in FIGS. 6A and 6B, the rear surface fixation bearing portion 22 and front surface fixation bearing portion 23 of the rotating drum 21 are fixed to a drum bearing fixation frame 13 of a rear surface member 217 provided on the base frame 11. Also, as shown in FIGS. 7 and 8, the rotating drum accommodates blade units 25 which have screw sliding surfaces 251 extending obliquely along the inner circumference over the full length of the inner wall 213 of the rotating drum in the rotation axis direction. The oblique extension direction of each blade unit 25 is set such that as the rotating drum 21 rotates, screws S fall onto a V-shaped screw receiving part 33 (see FIG. 5) of a start end portion 312 of the transfer rails 31.

A cross section of each screw sliding surface 251 is gently bent toward the inside over the full length. Therefore, if a blade unit 25 moves to the highest position of the rotating drum 21, the corresponding screw sliding surface 251 is inclined downward. As described with reference to FIG. 5, screws S falls onto the screw receiving part 33 provided near the rear surface of the rotating drum 21 due to the oblique extension of the blade unit 25.

As for the drive system of the rotating drum 21, a pair of drum mounting rollers 26 is provided on the base frame 11 so as to be parallel to each other and be rotatable, and the rotating drum 21 is mounted on the pair of drum mounting rollers 26, and a belt 271 is stretched between the rotating drum 21 and a drum driving motor 27 such that the belt is fit in a belt receiving groove 272 of the rotating drum 21. As a result, if the drum mounting rollers 26 rotate under control, the rotating drum 21 rotates.

[Screw Transfer Unit 3]

As shown in FIG. 5, the pair of linear transfer rails 31 having the central groove 311 is deeply inserted as the screw transfer unit 3 into the rotating drum 21 so as to reach the vicinity of the rear surface fixation bearing portion 22 and the vicinity of a portion directly under the screw input portion 24, and the V-shaped screw receiving part 33 being open upwardly is fixed to the start end portion 312 of the transfer rails 31. Therefore, screws S scooped to an upper position of the inside of the rotating drum 21 fall from the screw sliding surfaces 251 (see FIG. 7) onto the V-shaped screw receiving part 33. As a result, the screw parts (rod-like parts) S1 of some of the screws S are fit into the central groove 311 of the transfer rails 31 such that corresponding head parts S2 are suspended from the pair of linear transfer rails 31. In this state, the screws on the transfer rails 31 are transferred.

The transfer rails 31 extends from the rotating drum 21 to the screw discharging unit (escaper unit) 4 (FIG. 4), and the vibrating device 32 vibrates the transfer rails 31 such that all of a plurality of screws S proceeds in order toward the screw discharging unit 4. The transfer rails 31 of the vibrating device 32 are supported by a pair of vibrating plates 323. If a voltage is periodically applied to a vibrating solenoid 321 provided on the base frame 11, an absorption plate 322 firmly fixed to the transfer rails 31 is vibrated, whereby the transfer rails 31 are vibrated such that screws S on the transfer rails 31 moves.

Also, since the screw receiving part 33 extends to the vicinity of the screw input portion 24 of the rotating drum 21, it is possible to lengthen the transfer rails 31, and it is possible to dispose some components such as the screw dropping mechanism (to be described below) over the transfer rails 31 between the screw input portion 24 and the front surface fixation bearing portion 23 (see FIG. 7) of the discharge side.

Also, at an intermediate position of the transfer rails 31, a screw passage window 314 is formed so as to prevent passage of extra screws S. Further, at the final end portion 313 of the transfer rails 31, the screw discharging unit (escaper unit) 4 (to be described below) is disposed. Furthermore, on the downstream side of the rotating drum 21 from the front surface fixation bearing portion 23, a full-state sensor 61 (see FIGS. 3 and 5) is provided. If the full-state sensor 61 detects that a portion of the transfer rails 31 to the screw discharging unit 4 is full of screws S, it is unnecessary to supply additional screws S, and thus the operations of the rotating drum 21 and the drum driving motor (see FIG. 2) are stopped. Thereafter, if the full-state sensor 61 detects that the corresponding portion is not full of screws S, the operations of the rotating drum 21 and the drum driving motor 27 are restarted. Therefore, it is possible to suppress wasteful consumption of power.

Figure 13A:
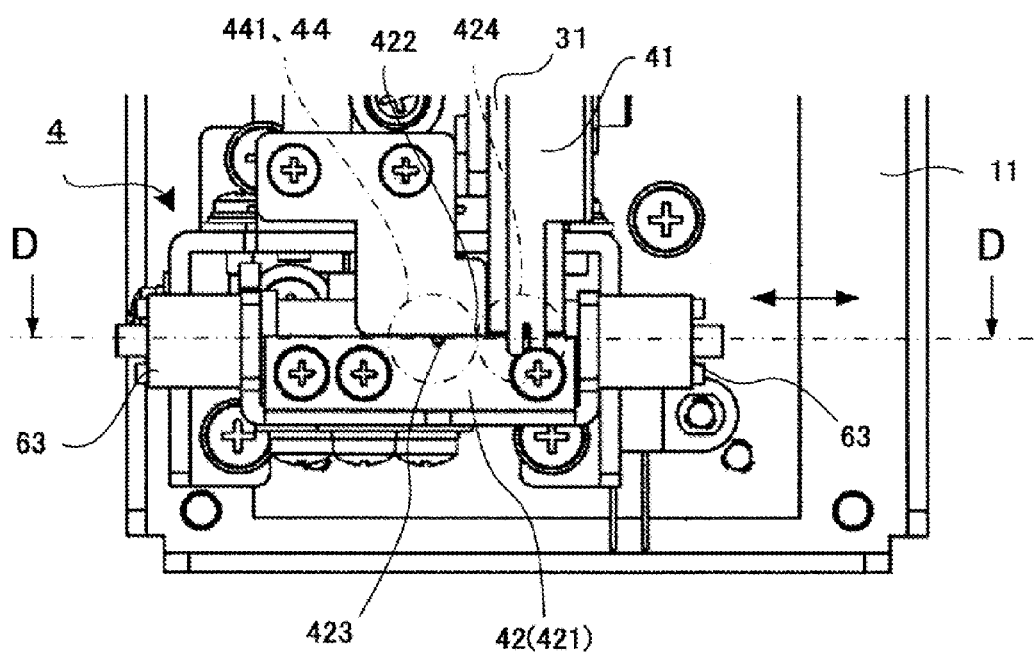
FIG. 13A is a plan view illustrating a screw discharging unit (an escaper unit) of FIG. 1.
Figure 13B:
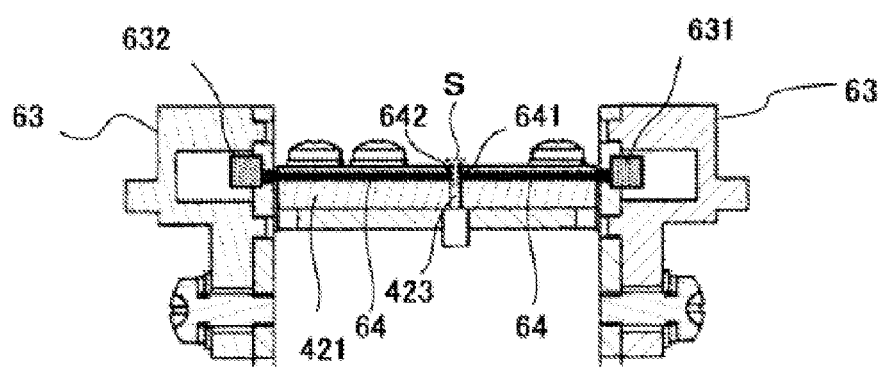
FIG. 13B is a cross-sectional view taken along a line D-D of FIG. 13A.

The configuration of the full-state sensor 61 is almost the same as that of a leading-end screw detecting unit 63 (to be described below), and thus is not shown in the drawings. As shown in FIG. 13B, the full-state sensor 61 is composed of a light emitting unit and a light receiving unit, and the light emitting unit and the light receiving unit use the tips of optical fibers, and thus can detect even very small components such as micro screws. Also, on the base frame 11 of the FIG. 5, a control board 16 is disposed.

[Screw Dropping Mechanism 5]

Figure 10:
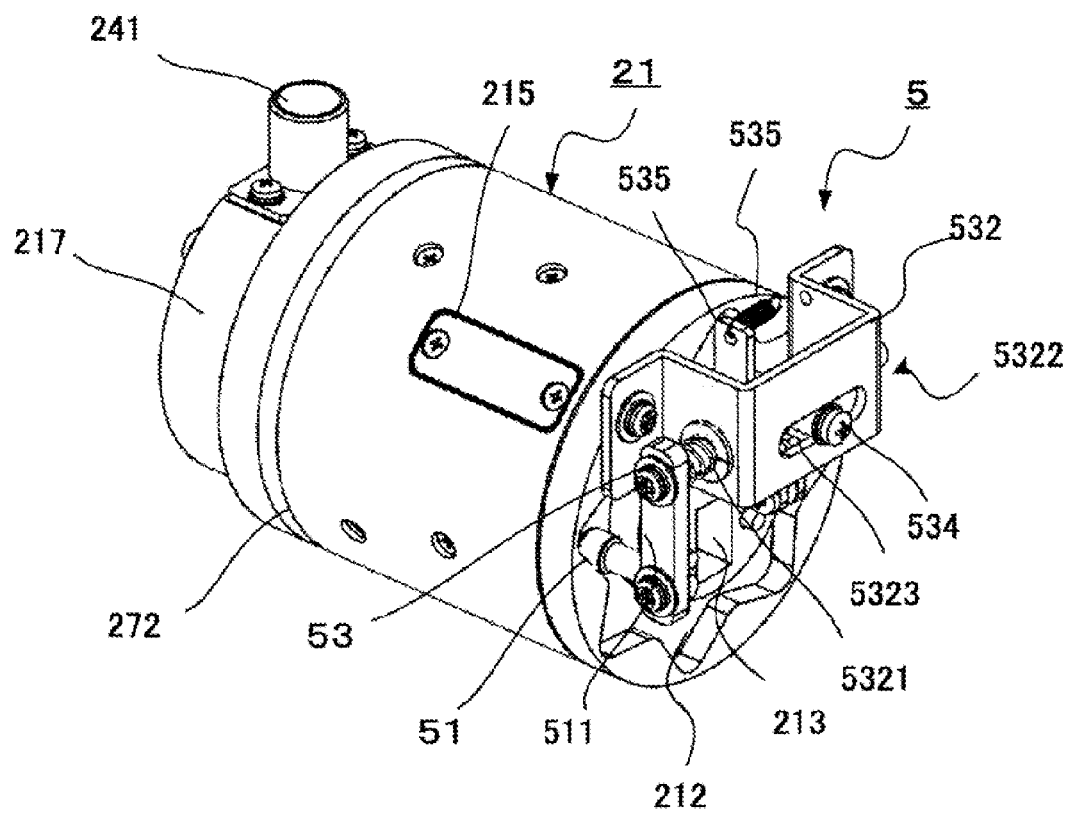
FIG. 10 is a perspective view illustrating a state where a screw dropping mechanism 5 has been attached to the rotating drum of the first embodiment.
Figure 11:
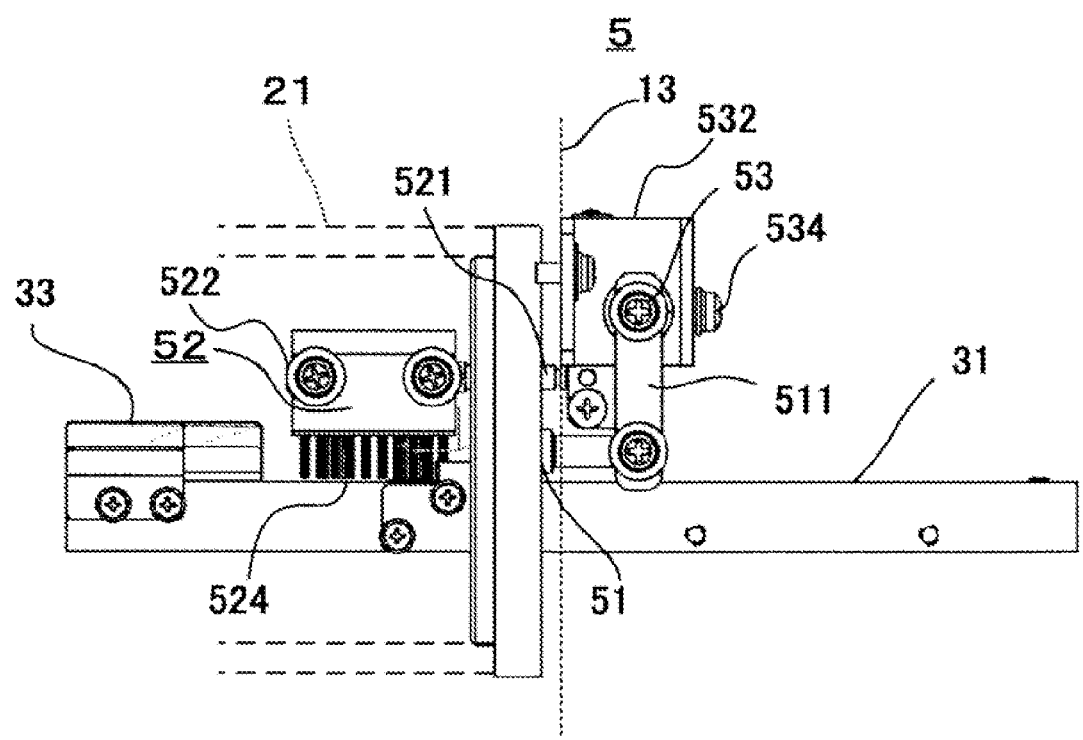
FIG. 11 is a side view illustrating the relation between transfer rails and the screw dropping mechanism of the first embodiment.

As shown in FIGS. 10, 11, and 12, in a case where a screw S is mounted on the transfer rails 31 so as to be on top of any other screw, the screw dropping mechanism 5 of the first embodiment shakes off the unaligned screw whose screw part (rod-like part) S1 is not fit in the central groove 311 by a brush 52 swinging, and then the dropped screw S is aligned. To this end, a brush shaft 521 having the brush 52 attached thereto is provided so as to extend from the outside into of the rotating drum 21 into the rotating drum 21 through a brush drive insertion opening 232 of the front surface fixation bearing portion 23 (see FIG. 8) of the rotating drum 21.

In order to swing the brush shaft 521, as shown in FIG. 12, the cam roller 51 (see FIG. 10) is connected to a pivot shaft 53 by a link 511 such that if the cam roller 51 moves along the surface of the drive cam 212 of the rotating drum 21, the link is swung to the left and right. Also, the pivot shaft 53 is connected to a blanket 532 such that the pivot shaft 53 is movable to the left and right. The blanket 532 has left and right bearings 5321 and 5322 and a guide hole 5323 long in a horizontal direction. Also, a guide rod 534 is provided so as to slide in the guide hole 5323, thereby guiding the brush shaft 521. Further, rollers 531 are provided at appropriate positions of the pivot shaft 53 so as to press a backup plate 523 in the left-right direction, and elastic coil springs 535 are provided on the backup plate 523 so as to press the rollers 531.

Therefore, if the rollers 531 swing, the backing plate 523 attached to the brush shaft 521 is swung to the left and right. As a result, the brush shaft 521 is rotated to the left and right. Also, as shown in FIG. 12, in order to make the rollers 531 follow the drive cam 212, extendable coil springs 536 are disposed.

Figure 9:
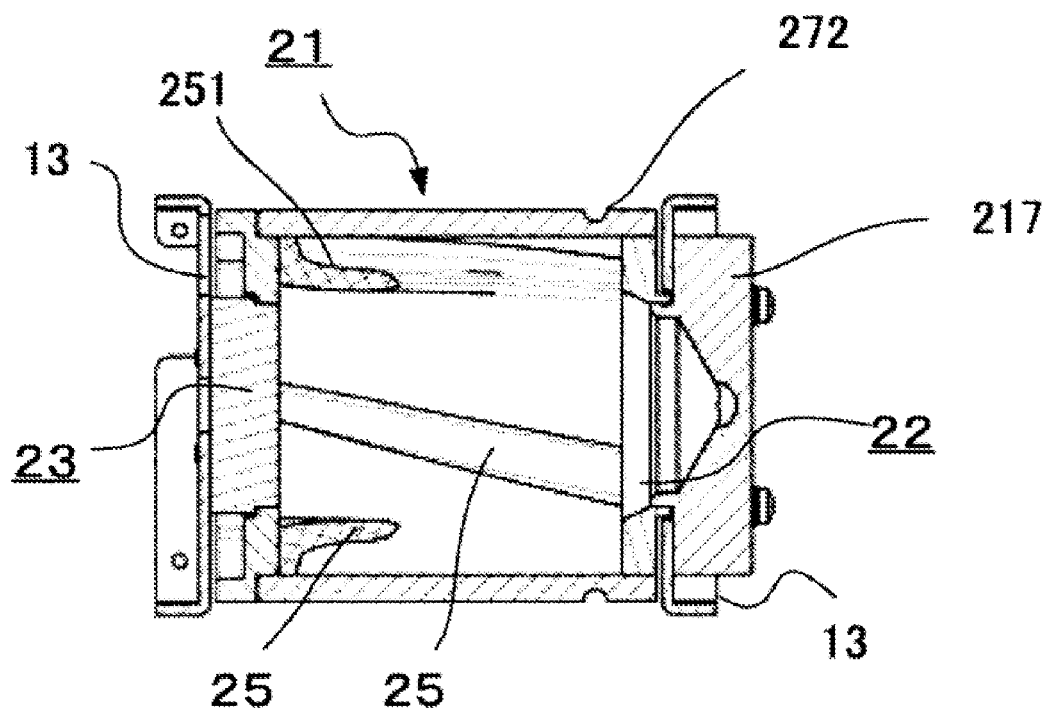
FIG. 9 is a cross-sectional view taken along a line C-C of FIG. 6A.

Also, the brush 52 is provided at the leading end portion 522 of the brush shaft 521 extending in the rotating drum 21, and if a screw S is mounted on the transfer rails 31 so as to be on top of any other screw S, the brush tips 524 swing, thereby shaking off the unaligned screw S such that the unaligned screw S falls onto the inner bottom 216 (see FIG. 4), and then the fallen screw S is aligned. In this case, since the positions of the brush tips 524 of the brush 52 are important, and are slightly different depending on the type of screws or the like, the positions of the brush tips 524 needs to be adjusted. To this end, as shown in FIGS. 3, 4, and 9, an adjustment window 215 with a lid is provided at an appropriate position of the outer circumferential surface of the cylindrical rotating drum 21, and is opened if necessary such that it is possible to adjust the positions of the brush tips 524.

[Screw Discharging Unit (Escaper Unit) 4]

The screw discharging unit (escaper unit) 4 is provided at the final end portion 313 of the transfer rails 31. If screws S are aligned and sent to the screw outlet 44, the screws S are taken out by hand or a robot if the screws S, and are sent to the next process.

The screw discharging unit 4 will be described with reference to FIGS. 13A to 14C. In FIG. 13A, screws S on the transfer rails 31 are aligned and are transferred to the final end portion 313, where a screw head pressing plate 41 is provided so as to press the head parts S2 of screws, thereby preventing the screws S from becoming misaligned due to vibration, and only one screw S of the final end portion 313 of the transfer rails 31 is extracted by a screw extracting mechanism 42. The screw extracting mechanism 42 includes an extraction plate 421 which moves to the left and right, and at the substantially central portion between the extraction plate 421 and a linear slide portion 422, a semicircular screw receiving groove 423 is formed in the end surface of the extraction plate 421 on the transfer rail (31) side so as to receive only one screw S.

Also, as shown in the cross-sectional view of FIG. 13B, the leading-end screw detecting unit 63 for detecting whether a screw S has been taken out from the screw receiving groove 423 is provided at the screw outlet 44 which is a screw discharge position 441. Similarly to the full-state sensor 61, the leading-end screw detecting unit 63 is composed of a light emitting unit 631 and a light receiving unit 632. As shown in FIG. 13B, the light emitting unit 631 and the light receiving unit 632 use the tips 641 and 642 of optical fibers 64. Therefore, even if a component such as a micro screw is very small, as long as the diameter of the component is in a restricted range, the leading-end screw detecting unit can detect whether the component exists.

Subsequently, the operation of the screw extracting mechanism 42 will be described with reference to FIGS. 14A, 14B, and 14C.

Figure 14A:
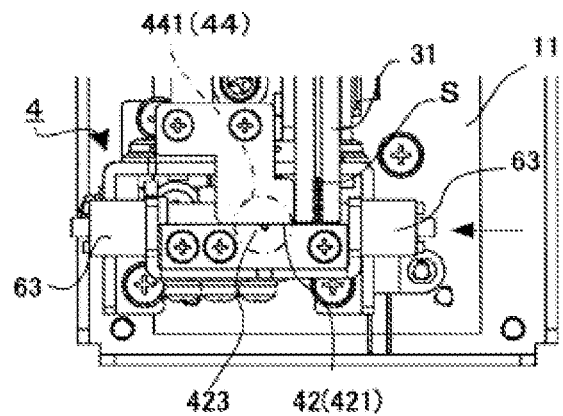
FIGS. 14A to 14C are explanatory views for explaining an operation of discharging a screw S in a state where a screw head pressing plate has been removed from FIG. 13.
Figure 14B:
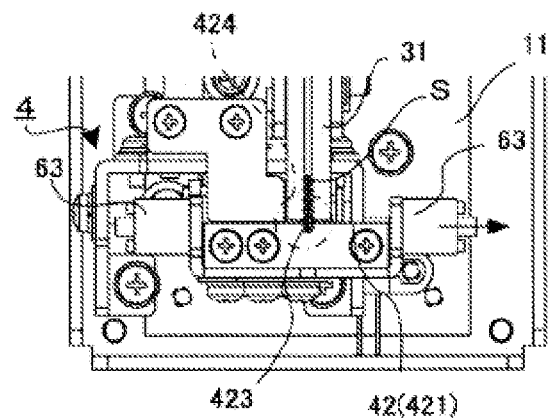
Figure 14C:
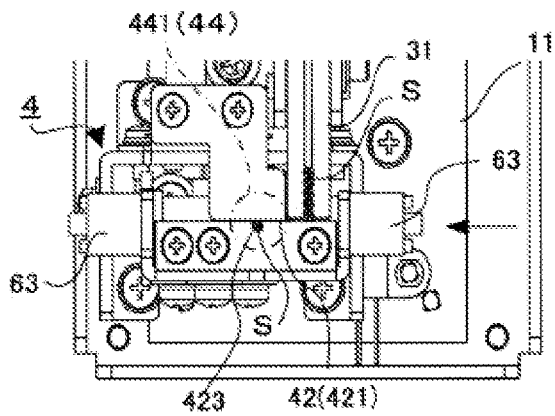

FIGS. 14A, 14B, and 14C are views illustrating states obtained by omitting the screw head pressing plate 41 from FIG. 13A. First, FIG. 14A shows a state where in the screw outlet 44, the screw receiving groove 423 is positioned, and a screw S has been taken out. In this case, since there is no screw S in the screw receiving groove 423 in the screw outlet 44, the leading-end screw detecting unit 63 detects that there is no screw S, and a transition to the state of FIG. 14B is performed.

In FIG. 14B, the extraction plate 421 moves to a screw delivery position 424 (the right side in FIG. 14B), and due to vibration of the transfer rails 31, one screw S is extracted and moves into the screw receiving groove 423 of the extraction plate 421. One screw S enters the screw receiving groove 423, and then a transition to the state of FIG. 14C is performed.

In FIG. 14C, in the state where the screw S is held in the screw receiving groove 423, the extraction plate 421 stops at the screw outlet 44, and waits for the screw to be taken out by hand or a robot.

Thereafter, the screw supply apparatus 1 repeats the above described operation with respect to screws S if necessary.

As described above, according to the invention of the screw supply apparatus of the first embodiment of the present invention, it is possible to efficiently align screws S, particularly, comparatively small-sized micro screws. Also, according to rotation of the rotating drum, the drive cam provided in the vicinity of the outer circumference of the rotating drum rotates, whereby the cam roller being in contact with the drive cam operates, thereby driving the screw dropping mechanism. Therefore, it is unnecessary to separately provide a driving source for the screw dropping mechanism. Further, since the pair of transfer rails of the screw transfer unit is linear, screws smoothly move, and the apparatuses are simply configured, and are stable, and can be easily maintained.

The rotating drum accommodates the blade units which have the screw sliding surfaces extending obliquely along the inner circumference over the full length of the inner wall of the rotating drum. Therefore, it is possible to surely scoop up screws S and drop screws onto the screw receiving unit of the start end portion of the transfer rails.

The screw receiving unit extends to the vicinity of the screw input portion of the rotating drum. Therefore, it is possible to lengthen the transfer rails, and to dispose the screw dropping mechanism or the like on the transfer rails between the screw input portion and the front surface fixation bearing portion of the discharge side.

Also, it is provided the full-state detecting unit for detecting whether there is any screw S on the transfer rails in the vicinity of the opening. If the full-state detecting unit detects that there is any screw S, rotation of the rotating drum is stopped. Meanwhile, if the full-state detecting unit detects that there is no screw, the rotating drum is rotated. Therefore, it is possible to efficiently drive the rotating drum. Also, the light emitting unit and the light receiving unit use the tips of optical fibers, and thus can surely act even on small-sized screws S.

Further, it is provided the screw outlet for taking out screws, and, it is provided leading-end screw detecting unit for detecting whether there is any screw necessary to be taken out in the vicinity of the screw outlet, and the screw extracting mechanism of the screw discharging unit is operated by the leading-end screw detecting unit. Therefore, it is possible to surely prepare a screw in the screw outlet. Also, the light emitting unit and the light receiving unit use the tips of optical fibers, and thus can surely act even on small-sized screws S.

On the transfer rails, the brush of the screw dropping mechanism is provided so as to swing, and shakes unaligned screws S off from the transfer rails to the inner bottom of the rotating drum. Therefore, it is possible to surely align screws. Especially, small-sized micro screws may be transferred even if they overlap each other. However, according to this invention, it is possible to surely align micro screws by rotation of the brush.

[Second Embodiment]

Subsequently, a screw supply apparatus according to a second embodiment of the present invention will be described in detail with reference to FIGS. 15 to 16B.

Figure 15:
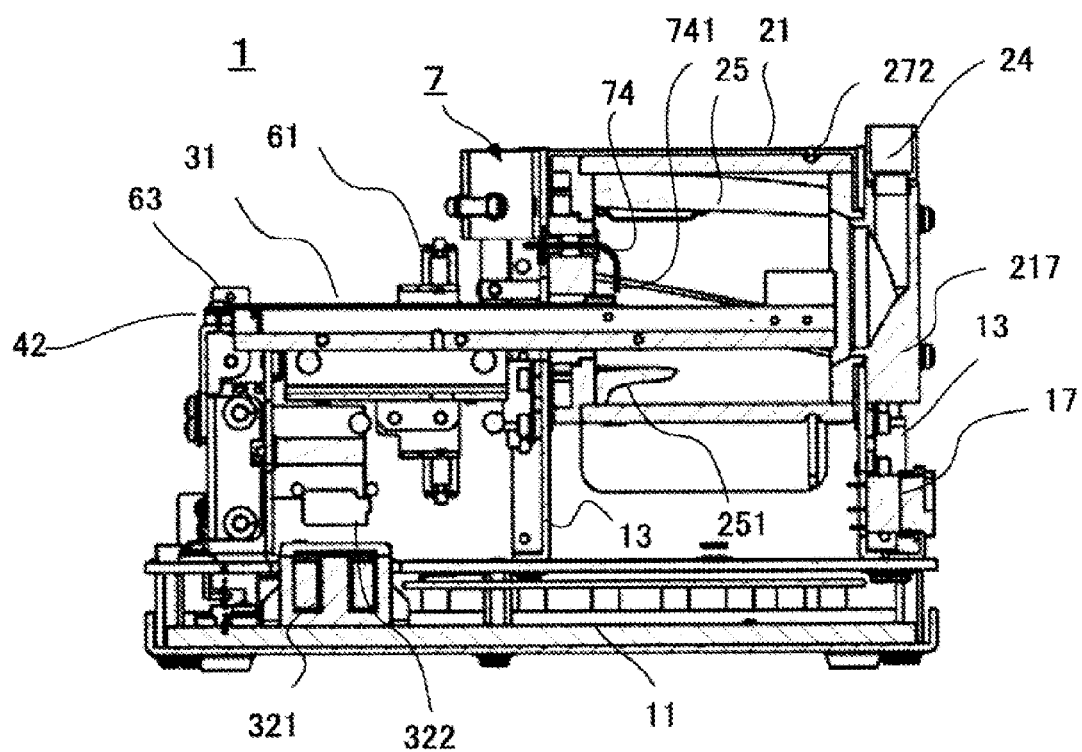
FIG. 15 is an exploded perspective view illustrating a state where a screw dropping mechanism of a second embodiment using air has been attached to a screw supply apparatus.

As shown in FIG. 15 illustrating the whole apparatus of the second embodiment, the configuration of the second embodiment is the same as that of the first embodiment, only except that instead of the screw dropping mechanism 5 using the brush 52 of the first embodiment, a screw dropping mechanism 7 is configured such that if a screw S is mounted on the transfer rails 31 so as to be on top of any other screw S, the screw dropping mechanism 7 repeats blowout and suction of air with respect to the head part S2 of the unaligned screw S on the transfer rails 31, thereby blowing off the unaligned screw S such that the unaligned screw S falls and then is aligned. For this reason, the screw dropping mechanism 7 will be described in detail, but the other configuration will not be described.

Figure 16A:
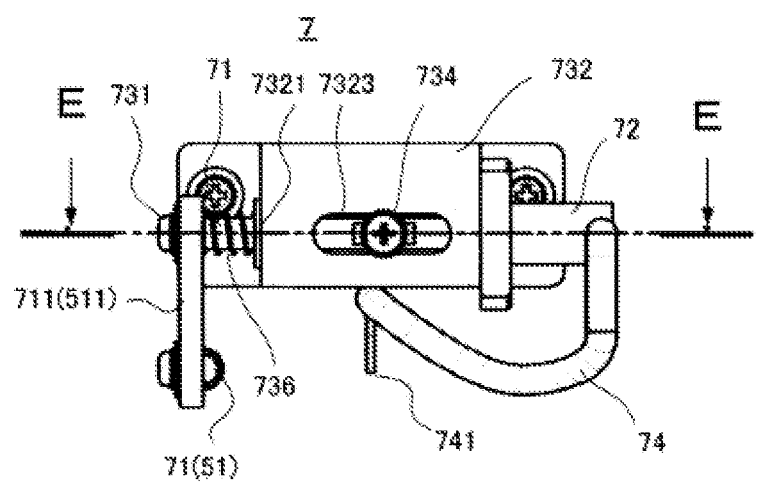
FIG. 16A is a front view illustrating the screw dropping mechanism of FIG. 15.
Figure 16B:
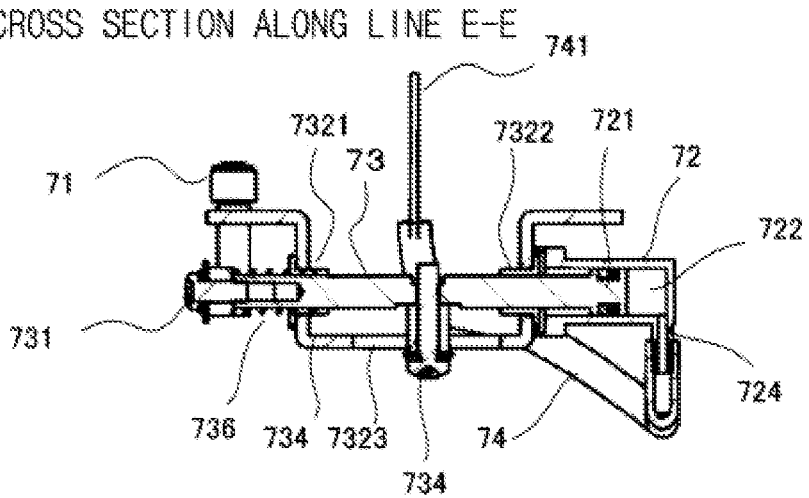
FIG. 16B is a cross-sectional view taken along a line E-E of FIG. 16A.

As shown in FIGS. 16A and 16B, even in the screw dropping mechanism 7 if a cam roller 71 (51) moves along the drive cam 212 of the rotating drum 21 of the first embodiment, a pivot shaft 73 connected to the cam roller 71 (51) through a link 711 (511) is swung to the left and right.

An extendable coil spring 736 is disposed so as to always push a tip portion 731 of the pivot shaft 73 on the link (711) side against the cam roller 71. In order to swing the pivot shaft 73 to the left and right, a blanket 732 is provided. The blanket 732 has left and right bearings 7321 and 7322 and a guide hole 7323 long in a horizontal direction. Also, a guide rod 734 is provided so as to slide in the long guide hole 7323, thereby guiding the pivot shaft 73.

On the opposite side of the pivot shaft 73 to the link (711) side, a cylinder portion 72 is provided. The tip of the pivot shaft 73 is disposed as a piston link 721 inside the cylinder portion 72. In a portion of the bottom 7 of the cylinder portion 72, an opening 724 is formed such that a change in the volume of the cylinder portion 72 due to a movement of the piston link 721 (in a case of FIG. 16B, a movement to the left or right) is transmitted to a tube 74. In the end of the tube 74, a blowout/suction opening 741 for blowing or sucking air is formed toward the transfer rails 31. If a screw S is mounted on the transfer rails 31 so as to be on top of any other screw S, the unaligned screw S is blown off such that it falls onto the inner bottom 216 (see FIG. 4), and then the fallen screw S is aligned.

Like this, according to the second embodiment of the present invention, since flow of air entering or exiting from the screw dropping mechanism is used, in addition to the effects of the first embodiment, it is possible to surely align components such as screws S without damaging the components. Especially, small-sized micro screws may be transferred even if they overlap each other. However, according to this invention, it is possible to surely align micro screws by air flow.

Also, it will be apparent that the above mentioned embodiments do not restrict the scope of the invention and various modifications and changes may be made without departing from the scope of the invention.

What is claimed is:

1. A screw supply apparatus which includes a screw feeding unit, a screw transfer unit, and a screw discharging unit, wherein the screw feeding unit includes a rotating drum having a horizontal rotating shaft,
   at a rear surface fixation bearing portion positioned on the rear surface side of the rotating drum, a screw input portion is provided for introducing screws into the rotating drum,
   at a front surface fixation bearing portion positioned on the front surface side of the rotating drum, an opening is formed,
   the screw transfer unit includes a pair of transfer rails, which has a central groove and is inserted from the opening of the front surface fixation bearing portion into the rotating drum,
   in the vicinity of the outer circumference of the rotating drum, a drive cam is provided,
   a cam roller is provided so as to come into contact with the drive cam according to rotation of the rotating drum, and
   if a screw is mounted on the transfer rails so as to be on top of any other screw, the cam roller is operated, whereby a screw dropping mechanism is operated so as to drop the unaligned screw into the rotating drum,
   wherein the screw discharging unit has a screw outlet for taking out screws and a leading-end screw detecting unit for detecting whether there is any screw necessary to be taken out in the vicinity of the screw outlet, in a case where the leading-end screw detecting unit detects that there is a screw, a screw extracting mechanism of the screw discharging unit is operated so as to take out the corresponding screw from the final end portion of the transfer rails and arrange the corresponding screw in the screw outlet, and the leading-end screw detecting unit includes a light emitting unit and a light receiving unit, which use the tips of optical fibers.

2. The screw supply apparatus according to claim 1, wherein the rotating drum accommodates blade units which have screw sliding surfaces extending obliquely along the inner circumference over the full length of the inner wall of the rotating drum, and the oblique extension direction of each of the blade units is set such that as the rotating drum rotates, screws fall onto a screw receiving part of a start end portion of the transfer rails.

3. The screw supply apparatus according to claim 2, wherein the screw receiving part extends to the vicinity of the screw input portion of the rotating drum.

4. The screw supply apparatus according to claim 2, wherein a full-state detecting unit is provided so as to detect whether there is any screw on the transfer rails in the vicinity of the opening, if the full-state detecting unit detects that there is a screw, rotation of the rotating drum is stopped, and if the full-state detecting unit detects that there is no screw, the rotating drum is rotated, and the full-state detecting unit includes a light emitting unit and a light receiving unit, which use the tips of optical fibers.

5. The screw supply apparatus according to claim 3, wherein a full-state detecting unit is provided so as to detect whether there is any screw on the transfer rails in the vicinity of the opening, if the full-state detecting unit detects that there is a screw, rotation of the rotating drum is stopped, and if the full-state detecting unit detects that there is no screw, the rotating drum is rotated, and the full-state detecting unit includes a light emitting unit and a light receiving unit, which use the tips of optical fibers.

6. The screw supply apparatus according to claim 1, wherein the screw dropping mechanism includes a pivot shaft which is swung to the left and right by the cam roller, a brush shaft which is connected to the pivot shaft and is rotated by an operation of the pivot shaft, and a brush which is provided at the leading end portion of the brush shaft extending in the rotating drum, and if a screw is mounted on the transfer rails so as to be on top of any other screw, the tips of the brush swing, thereby shaking off the unaligned screw such that the corresponding screw falls and is aligned.

7. The screw supply apparatus according to claim 5, wherein the screw dropping mechanism includes a pivot shaft which is swung to the left and right by the cam roller, a brush shaft which is connected to the pivot shaft and is rotated by an operation of the pivot shaft, and a brush which is provided at the leading end portion of the brush shaft extending in the rotating drum, and if a screw is mounted on the transfer rails so as to be on top of any other screw, the tips of the brush swing, thereby shaking off the unaligned screw such that the corresponding screw falls and is aligned.

8. The screw supply apparatus according to claim 1, wherein the screw dropping mechanism includes a cylinder portion which is operated by movement of the cam roller to the left and right, and if a screw is mounted on the transfer rails so as to be on top of any other screw, the screw dropping mechanism blows the unaligned screw off with air of the cylinder portion such that the corresponding screw falls and is aligned.

9. The screw supply apparatus according to claim 5, wherein the screw dropping mechanism includes a cylinder portion which is operated by movement of the cam roller to the left and right, and if a screw is mounted on the transfer rails so as to be on top of any other screw, the screw dropping mechanism blows the unaligned screw off with air of the cylinder portion such that the corresponding screw falls and is aligned.

10. The screw supply apparatus according to claim 1, wherein the screws are micro screws.

* * * * *